Oct. 29, 1968    R. P. CROWLEY    3,407,573
CHROMATOGRAPHIC COLUMNS
Filed June 7, 1967

INVENTOR.
RICHARD P. CROWLEY

*Richard P. Crowley*

3,407,573
CHROMATOGRAPHIC COLUMNS
Richard P. Crowley, Milton, Mass., assignor to Abcor, Inc., Cambridge, Mass., a corporation of Massachusetts
Filed June 7, 1967, Ser. No. 644,176
9 Claims. (Cl. 55—386)

ABSTRACT OF THE DISCLOSURE

This invention describes an improved chromatographic column of the Golay type in which open cell polymeric foam material extends from the internal wall of a column inwardly towards the center to provide a chromatographic column with a central open flow passage for the gas flowing through and a roughened open cell internal wall. The cellular lining provides both greatly increased surface area for the separation of a sample stream and prevents laminar flow velocities of the sample and gas carrier streams to promote improved resolution.

Background of the invention

In gas chromatography, a gas sample is passed through a chromatographic column either with or without the use of an inert carrier gas and the sample stream is separated into chromatographic fractions by the different absorptive affinities of the sample component in or with a liquid or solid. For example, in the separation of a gas sample stream, a gas-liquid, gas-solid, a liquid-liquid or a liquid-solid combination may be employed as a separatory material.

One known chromatographic column is the Golay column wherein an elongated tube such as a capillary tube contains no subdivided packing material therein, but is internally coated with a partitioning agent. For example, with a gas-liquid separation, the Golay column is internally coated with a thin film of a partitioning agent often of the type used in packed columns, while for gas-solid separation, the column may be internally coated with an absorbent material in powdered, gel or polymeric bead form. In some Golay columns, the internal wall may be coated with particles which support and are coated with a thin film of a partitioning agent. An improved Golay type column is described in U.S. Patent No. 3,307,333 issued Mar. 7, 1967 wherein randomly intertwined fibers are positioned within the column, the fibers having a different attraction for the sample mixture to be analyzed. The fibers may completely fill the column or only a portion thereof.

Summary of the invention

My invention relates to an improved chromatographic column which column is characterized by a greatly increased surface area for the separation of the sample stream and which column prevents the formation of laminar flow and improves resolution by virtue of a rough interior surface.

My invention includes the preparation of a chromatographic column wherein the interior wall is characterized by a thin layer of open cell or breathable type polymeric foam material extending inwardly toward the center of the column and the column is further characterized by a central flow passage therein for the introduction and passage of the sample stream through the column. The foam material comprises a majority of interconnecting cells which permit the passage of a gas or liquid therethrough and in particular consists essentially of interconnecting cells of relatively uniform size or a reticulated foam material. The use of foam cellular material for the interior wall provides a greatly increased surface area for gas-solid or gas-liquid contact with the sample stream thereby permitting the column length to be shortened and still achieve a desired separation. Further, the use of an interior lining of foam material prevents the formation of laminar flow velocities with an inverted nose cone which is common with the chromatographic columns having a smooth interior. The open cellular foam interior wall improves resolution by preventing laminar flow and directing the fluid sample stream, particularly in small diameter columns of 1 inch and less, towards transverse or lateral flow as it passes through the column.

My cellular lining may be employed alone or in combination with liquid or solid gel or gel-like partitioning agents in the foam or coated on the surface thereof in order to provide the desired separation. The cell size of the foam may vary from a fraction of a millimeter to about ½ inch in size. For example, with certain reticulated urethane foams, the average cell size generally ranges from about $\frac{1}{64}$ of an inch to ¼ of an inch. The smaller cell size is desirable for improving the resolution, but results in greater pressure drops while the larger size cells reduce the pressure drop along the column length and promote the lateral flow across the column diameter of the sample streams. In general, open cell foam represents interconnecting cells of over 90% of the cellular material. Material particularly useful in my invention comprises an organic polymeric material of a rigid, semi-rigid or flexible type foam which may be formed by the use of typical blowing agents which on heating decompose to give off a gaseous product such as nitrogen thereby expanding the organic plastic or semiplastic material into a foam structure. Foam material may also be prepared by the use of liquid blowing agents which on heating create a vapor which expands the plastic materials, or foams may be created by the mechanical incorporation of a gas such as air or carbon dioxide in a latex, or a plastic material. Typical blowing agents which may be employed would include azodicarbonamide, dinitrosopentamethylenetetramine, benzenesulfonylhydrazide as well as liquid hydrocarbons and chloro and fluorocarbons such as Freons.

Closed cell foam material may also be employed in my invention. However, its utility is limited since only the ruptured cells on the surface of the blown foam material may be used. Therefore, closed cell foam decreases the amount of surface area available for the separation and the effect of transverse movement on the sample stream. However, a closed cell foam which has been abraded or reticulated to increase the surface area may be employed as within the definition of open cell foam as described herein.

A wide variety of both inorganic and organic materials may be used to prepare the cellular material in my improved chromatographic column. Typical polymeric materials include both natural and synthetic elastomers such as natural rubber, butadiene copolymers, styrene-butadiene copolymers, acrylonitrile rubbers, chloroprene rubbers and the like. Generally, polymeric or rubber containing latices are prepared in cellular form by mechanically incorporating air into the latex solution. Other polymeric materials includes the urethane type polymers such as polyurethane wherein the isocyanate material is reacted with water to form a urethane foam structure or the isocyanate may be blown with a liquid Freon. Urethane foam material may also be reticulated by hydrolizing the urethane elastomer with an alkali or other material to dissolve the walls of most of the cells thereby leaving a grid-like structure of reticulated foam material. Other materials useful for preparing foams include vinyl resins such as polyvinyl chloride and the copolymers of vinyl chloride and vinyl acetate as well as acrylic resins, phenol formaldehyde resins and the like.

Description of the preferred embodiments

Figure 1:
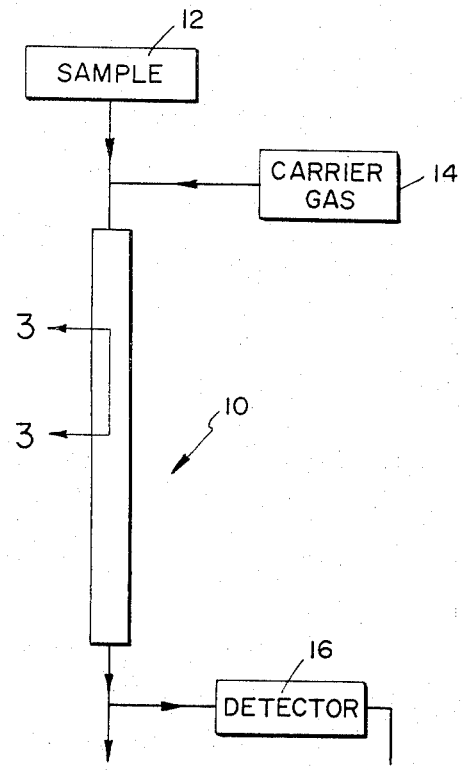
FIG. 1 is a general schematic view of a chromatographic apparatus.

FIG. 1 illustrates a typical gas chromatographic apparatus employed in my columns comprising a column 10, a source of sample material 12 such as a gas or liquid and a source of a carrier fluid 14 such as an inert gas like helium. The sample fluid is introduced into the top of the column and driven axially through the column by the carrier gas. The chromatographic fractions separated in the column are detected upon emergence by a detector 16 such as a thermo-conductivity cell, flame ionization detector, an electron capture detector and an ultrasonic detector or the like.

Figure 2:
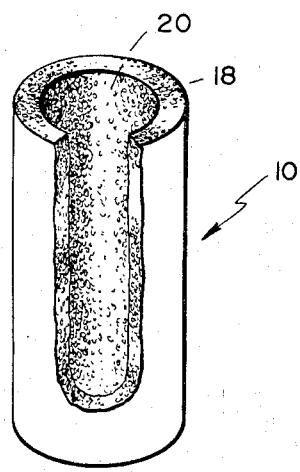
FIG. 2 is an enlarged fragmentary isometric view of my column containing the interior wall of foam.
Figure 3:
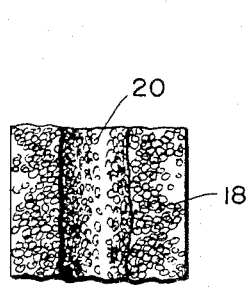
FIG. 3 is a cross-sectional view taken along the lines 3—3 of FIG. 1.

FIGS. 2 and 3 illustrate a column of my invention wherein the column 10 has its interior walls coated with an open cell foam layer 18 which layer may be coated with a liquid partitioning agent having a preferred affinity for one or more components of the gas sample stream to be separated in the column. The foam 18 extends inwardly from the interior wall of a column 10 towards the center, however, a central passage 20 free of separatory material or foam is left for the introduction and passage of the carrier and sample streams through the column.

My improved chromatographic columns shown in FIGS. 1, 2 and 3 may also be employed in liquid chromatography wherein the cellular material 18 includes an ion exchange resin such as a sulfonated resin like sulfonated polystyrene or other solid or gel polymeric, or inorganic or organic sorptive subdivided particles.

My improved chromatographic column may be prepared for example, by coating the internal wall of the solid tubular member with a vinyl chloride plastisol containing a blowing agent and thereafter heating the plastisol coated tubular member to decompose the blowing agent and to create a cellular layer on the internal wall of the tubular member. Where the cellular layer is not to be employed alone as sorptive material in the separation process, then a partitioning agent may be coated on the cellular wall by drawing the liquid partitioning agent through the tube then formed. A liquid, solid or gel type additive may also be incorporated into the plastisol prior to the blowing process so that upon formation of the interior cellular wall the separatory material is formed in the cellular structure. A similar procedure can also be employed with formation of an open cell urethane foam inside the hollow tubular member.

In the plastisol methods, the entire column may be formed from the same material. The tube is formed from the plastisol by heating specifically to gel the plastisol and not to decompose the blowing agent. Then to prepare the foam wall as above, the temperature is increased and the tubular member is foamed internally while the exterior wall or skin is prevented from foaming. In this embodiment the liquid or solid partitioning agent may be added afterwards or incorporated directly into the composition prior to forming the tubular member and the interior wall of foam. In this manner, an inexpensive flexible chromatographic column is prepared which may be unrolled from a larger size roll cut to the desired length and then employed in an analytical column and thereafter discarded where reuse is not practical because of contamination or some other reason. In this method of preparing my improved column, the polymeric material in plastisol or powder form and containing the blowing agent is formed such as by extrusion into a hollow tubular member initially at a temperature below the decomposition temperature of the blowing agent employed. After the formation of the tube either in the same die or in a different die, the temperature is increased above the decomposition temperature of the blowing agent so that the interior wall of the tubular member is blown into a cellular structure while the exterior wall remains a smooth continuous coating against the internal wall of the extrusion member or die. In this embodiment for example, a vinyl chloride resin or olefinic resin such as polyolefin, polypropylene and the like may be used employing conventional, extruding and forming techniques.

Figure 4:
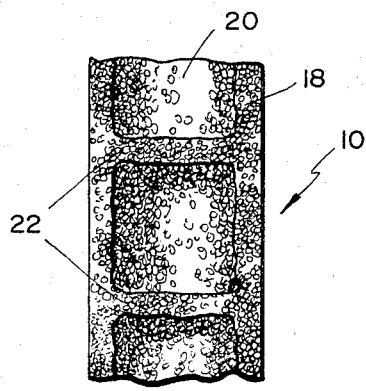
FIG. 4 is a sectional front view of a further embodiment of my invention.

Another variation of my invention is to discriminately blow the blowing agent in selected areas of the column to form a series of cellular trays 22 as shown in FIG. 4. That is, when the cellular material is being blown it is controlled so that a central passageway of predetermined dimension is defined within the tube. By selectively blowing to a greater degree in one or more areas, the cellular material will completely fill the column, creating in effect cellular trays or baffles, analogous to sintered plates.

Accordingly, my invention provides improved chromatographic columns for both gas and liquid chromatography wherein an interior wall of foam material is employed to greatly increase the surface area available for the separation of the sample stream and also to promote transverse or lateral flow of fluid stream as it moves through the column. My foam material may generally extend inwardly from about $\frac{1}{5}$ to $\frac{2}{3}$ of the internal radius of the column and it may be used alone or in combination with separatory material.

What I claim is:

1. An improved chromatographic apparatus for the separation of a sample stream into chromatographic fractions which comprises:
   (a) a chromatographic column including a hollow member having an interior wall composed of polymeric foam material of essentially interconnecting cells, the foam material extending inwardly toward the center of the hollow member, the member characterized by an open central flow passage therein and at least one layer of polymeric foam material extending across the central flow passage whereby lateral flow of the sample and carrier streams at periodic intervals is provided to improve resolution;
   (b) means to introduce a fluid sample stream into the column for separation of at least one chromatographic component;
   (c) means to introduce a fluid carrier stream into the column to drive the sample stream in a generally axial direction through the column; and
   (d) means to withdraw one or more chromatographic components from the column.

2. The chromatographic column of claim 1 wherein the foam material extends inwardly from about $\frac{1}{5}$ to $\frac{2}{3}$ of the internal radius of the column.

3. The chromatographic column of claim 1 wherein the foam material contains a substance which has a selective affinity for at least one fraction of the sample stream.

4. The chromatographic column of claim 1 wherein the foam material is a reticulated foam material.

5. The chromatographic column of claim 1 wherein the foam material is selected from the group of polymeric materials consisting of vinyl chloride resins, phenol formaldehyde resins, urethane resins, acrylic resins and natural and synthetic elastomers.

6. The chromatographic column of claim 1 wherein the interconnecting cells represents at least 90% of the cells and the cells are essentially uniform in size.

7. The chromatographic column of claim 1 wherein the exterior wall of the chromatographic column is composed of the same material as the interior foamed wall.

8. The apparatus of claim 1 which includes means to detect one or more chromatographic components separated by the column.

9. The apparatus of claim 1 wherein the foam material contains a liquid partitioning agent on the surface thereof.

References Cited

UNITED STATES PATENTS

| | | | |
|---|---|---|---|
| 3,347,020 | 10/1967 | Van Venrooy | 55—67 |
| 3,357,158 | 12/1967 | Hollis | 55—67 |
| 2,920,717 | 1/1960 | Tuttle et al. | 210—496 X |
| 3,293,174 | 12/1966 | Robjohns | 210—510 X |
| 3,298,973 | 1/1967 | Quarles et al. | 260—2.5 |
| 3,303,146 | 2/1967 | Chebiniak | 260—2.5 |
| 3,307,333 | 3/1967 | Norem et al. | 55—197 |

OTHER REFERENCES

Winsten, Walter A.: "Reversed-Phase Partition Chromatography on Microporous Polymeric Supports," Analytical Chemistry, vol. 34, No. 10, September 1962, pp. 1334–1335.

REUBEN FRIEDMAN, *Primary Examiner.*

J. L. DE CESARE, *Assistant Examiner.*